(12) United States Patent
Shankar et al.

(10) Patent No.: US 12,120,390 B2
(45) Date of Patent: *Oct. 15, 2024

(54) METHODS AND APPARATUS TO DETECT AND RECTIFY FALSE SET TOP BOX TUNING DATA

(71) Applicant: The Nielsen Company (US), LLC, New York, NY (US)

(72) Inventors: Balachander Shankar, Tampa, FL (US); Jonathan Sullivan, Hurricane, UT (US); Molly Poppie, Arlington Heights, IL (US); John Charles Coughlin, Oldsmar, FL (US); Neung Soo Ha, Bethesda, MD (US); Paul Chimenti, Tampa, FL (US); Rachel Worth Olson, Elk Grove Village, IL (US); Samantha M. Mowrer, San Francisco, CA (US); David J. Kurzynski, South Elgin, IL (US); Joshua Ivan Friedman, New York, NY (US); Adam E. Hasinski, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,913

(22) Filed: Apr. 28, 2023

(65) Prior Publication Data

US 2023/0291968 A1     Sep. 14, 2023

Related U.S. Application Data

(63) Continuation of application No. 17/727,388, filed on Apr. 22, 2022, now Pat. No. 11,647,254, which is a
(Continued)

(51) Int. Cl.
*H04L 21/04*     (2006.01)
*H04N 21/25*     (2011.01)
(Continued)

(52) U.S. Cl.
CPC ..... *H04N 21/44222* (2013.01); *H04N 21/251* (2013.01); *H04N 21/25833* (2013.01); *H04N 21/6582* (2013.01); *H04N 21/84* (2013.01)

(58) Field of Classification Search
None
See application file for complete search history.

(56) References Cited

U.S. PATENT DOCUMENTS 7,949,565 B1     5/2011   Eldering et al.
8,549,551 B2    10/2013   Hadfield et al.
(Continued)

OTHER PUBLICATIONS

United States Patent and Trademark Office, "Non-Final Office Action," mailed in connection with U.S. Appl. No. 15/820,104, on Jul. 24, 2018, 7 pages.
(Continued)

*Primary Examiner* — Cai Y Chen

(57)     ABSTRACT

Methods, apparatus, systems, and articles of manufacture are disclosed to rectify false set top box tuning data. Disclosed examples methods include identifying, by executing an instruction with a processor, in the return path data, first tuning data corresponding to a first group of set top boxes, the first group of set top boxes classified as associated with machine events, determining, by executing an instruction with a processor, a ratio between first tuning events in the return path data and second tuning events in the return path data, the first tuning events attributed to the first group of the set top boxes, the second tuning events attributed to a second group of the set top boxes classified at not associated with machine events, and in response to the ratio satisfying a
(Continued)

threshold during a time interval, removing second tuning data associated with the time interval from the first tuning data.

20 Claims, 11 Drawing Sheets

Related U.S. Application Data continuation of application No. 16/747,374, filed on Jan. 20, 2020, now Pat. No. 11,317,148, which is a continuation of application No. 15/820,104, filed on Nov. 21, 2017, now Pat. No. 10,542,316.

(51) Int. Cl.
  *H04N 21/258* (2011.01)
  *H04N 21/442* (2011.01)
  *H04N 21/658* (2011.01)
  *H04N 21/84* (2011.01)

(56) References Cited

U.S. PATENT DOCUMENTS

| | | | | |
|---|---|---|---|---|
| 8,930,978 | B2* | 1/2015 | Vinson | H04H 60/61 |
| | | | | 705/7.29 |
| 10,542,316 | B2* | 1/2020 | Shankar | H04N 21/44222 |
| 11,317,148 | B2 | 4/2022 | Shankar et al. | |
| 2012/0014147 | A1 | 1/2012 | Radosevich | |
| 2013/0014147 | A1* | 1/2013 | Hadfield | H04H 60/43 |
| | | | | 725/14 |
| 2017/0004526 | A1 | 1/2017 | Morovati et al. | |

OTHER PUBLICATIONS

United States Patent and Trademark Office, "Non-Final Office Action," mailed in connection with U.S. Appl. No. 15/820,104, on May 1, 2019, 7 pages.

United States Patent and Trademark Office, "Notice of Allowance," mailed in connection with U.S. Appl. No. 15/820,104, on Sep. 13, 2019, 7 pages.

United States Patent and Trademark Office, "Final Office Action," mailed in connection with U.S. Appl. No. 15/820,104, on Dec. 18, 2018, 7 pages.

United States Patent and Trademark Office, "Corrected Notice of Allowability," mailed in connection with U.S. Appl. No. 16/747,374, on Mar. 30, 2022, 4 pages.

United States Patent and Trademark Office, "Notice of Allowance and Fee(s) Due," mailed in connection with U.S. Appl. No. 16/747,374, on Dec. 1, 2021, 7 pages.

United States Patent and Trademark Office, "Non-Final Office Action," mailed in connection with U.S. Appl. No. 16/747,374, on Jul. 21, 2021, 5 pages.

United States Patent and Trademark Office, "Final Office Action," mailed in connection with U.S. Appl. No. 16/747,374, on Apr. 7, 2021, 9 pages.

United States Patent and Trademark Office, "Non-Final Office Action," mailed in connection with U.S. Appl. No. 16/747,374, on Oct. 15, 2020, 8 pages.

* cited by examiner

| Date | "feature activated" event start time | "follow-up tuning" event start time | Count | Cumulative Percent |
|---|---|---|---|---|
| 28-Sep-16 | 19:57:00 | 19:57:02 | 410 | 55.3 |
| 28-Sep-16 | 19:57:00 | 19:57:03 | 207 | 83.3 |
| 28-Sep-16 | 19:57:00 | 19:57:04 | 100 | 96.8 |
| 28-Sep-16 | 19:57:00 | 19:57:05 | 14 | 98.7 |
| 28-Sep-16 | 19:57:00 | 19:57:06 | 2 | 98.9 |
| 28-Sep-16 | 19:57:00 | 19:57:07 | 2 | 99.2 |
| 28-Sep-16 | etc. | etc. | etc. | etc. |

FIG. 6

| Date/Minute | Set Top Box Activity | AME Device Activity | Set Top Box - Station | AME Device - Station |
|---|---|---|---|---|
| 9/26/2016 23:54:00 | LIVE_TUNE | Live_Tune | 4555 | 4555 |
| 9/26/2016 23:55:00 | LIVE_TUNE | Live_Tune | 4555 | 4555 |
| 9/26/2016 23:56:00 | LIVE_TUNE | Live_Tune | 4555 | 4555 |
| 9/26/2016 23:57:00 | LIVE_TUNE | Live_Tune | 5894 | 4555 |
| 9/26/2016 23:58:00 | LIVE_TUNE | Live_Tune | 5894 | 4555 |
| 9/26/2016 23:59:00 | LIVE_TUNE | Live_Tune | 5894 | 4555 |
| . | . | . | . | . |
| . | . | . | . | . |
| 9/27/2016 00:14:00 | LIVE_TUNE | Live_Tune | 5894 | 4555 |
| 9/27/2016 00:15:00 | LIVE_TUNE | Live_Tune | 5894 | 4555 |
| 9/27/2016 00:16:00 | LIVE_TUNE | Live_Tune | 5077 | 5077 |
| 9/27/2016 00:17:00 | LIVE_TUNE | Live_Tune | 5077 | 5077 |

FIG. 7

| Date/Minute | Set Top Box Activity | AME Device Activity | Set Top Box - Station | AME Device - Station |
|---|---|---|---|---|
| 9/27/2016 0:57:00 | Live | No Data | 6965 | No Data |
| 9/27/2016 0:57:00 | Timer_record | No Data | 5234 | No Data |
| 9/27/2016 0:58:00 | Live | No Data | 6965 | No Data |
| 9/27/2016 0:58:00 | Timer_record | No Data | 5234 | No Data |
| 9/27/2016 0:59:00 | Live | No Data | 6965 | No Data |
| 9/27/2016 0:59:00 | Timer_record | No Data | 5234 | No Data |

FIG. 8

METHODS AND APPARATUS TO DETECT AND RECTIFY FALSE SET TOP BOX TUNING DATA

CROSS-REFERENCE TO RELATED APPLICATIONS

This disclosure is a continuation of U.S. patent application Ser. No. 17/727,388, entitled "METHODS AND APPARATUS TO DETECT AND RECTIFY FALSE SET TOP BOX TUNING DATA," and filed on Apr. 22, 2022 and Patented as U.S. Pat. No. 11,647,254 on May 9, 2023, which is a continuation of U.S. patent application Ser. No. 16/747,374, entitled "METHODS AND APPARATUS TO DETECT AND RECTIFY FALSE SET TOP BOX TUNING DATA," and filed on Jan. 20, 2020 and Patented as U.S. Pat. No. 11,317,148 on Apr. 26, 2022, which is a continuation of U.S. Patent Application Ser. No. 15/820,104, entitled "METHODS AND APPARATUS TO DETECT AND RECTIFY FALSE SET TOP BOX TUNING DATA," and filed on Nov. 21, 2017 and Patented as U.S. Pat. No. 10,542,316 on Jan. 21, 2020, each of which is hereby incorporated by reference herein in its entirety.

FIELD OF THE DISCLOSURE

This disclosure relates generally to processing set top box tuning data, and, more particularly, to methods and apparatus to detect and rectify false set top box tuning data.

BACKGROUND

In recent years, televisions present media via a set top box. Media-centric companies such as, for example, advertising companies, broadcasting networks, etc., are often interested in the viewership of broadcasted media. In some examples, the set top box records and reports tuning data representing tuning events that track viewer activities including changing the channel, turning on/off the set top box, pausing a channel via a digital video recorder (DVR), etc. The set top box tuning data provide a metric in determining the audience size for a broadcasted media.

BRIEF DESCRIPTION OF THE DRAWINGS

FIG. 6 is a first example table of tuning data indicating a pattern of tuning data indicative of a machine event.

FIG. 7 is a second example table of tuning data indicating a pattern of tuning data indicative of a machine event.

FIG. 8 is a third example table of tuning data indicating a pattern of tuning data indicative of a machine event.

The figures are not to scale. Wherever possible, the same reference numbers will be used throughout the drawing(s) and accompanying written description to refer to the same or like parts.

DETAILED DESCRIPTION

Figure 1:
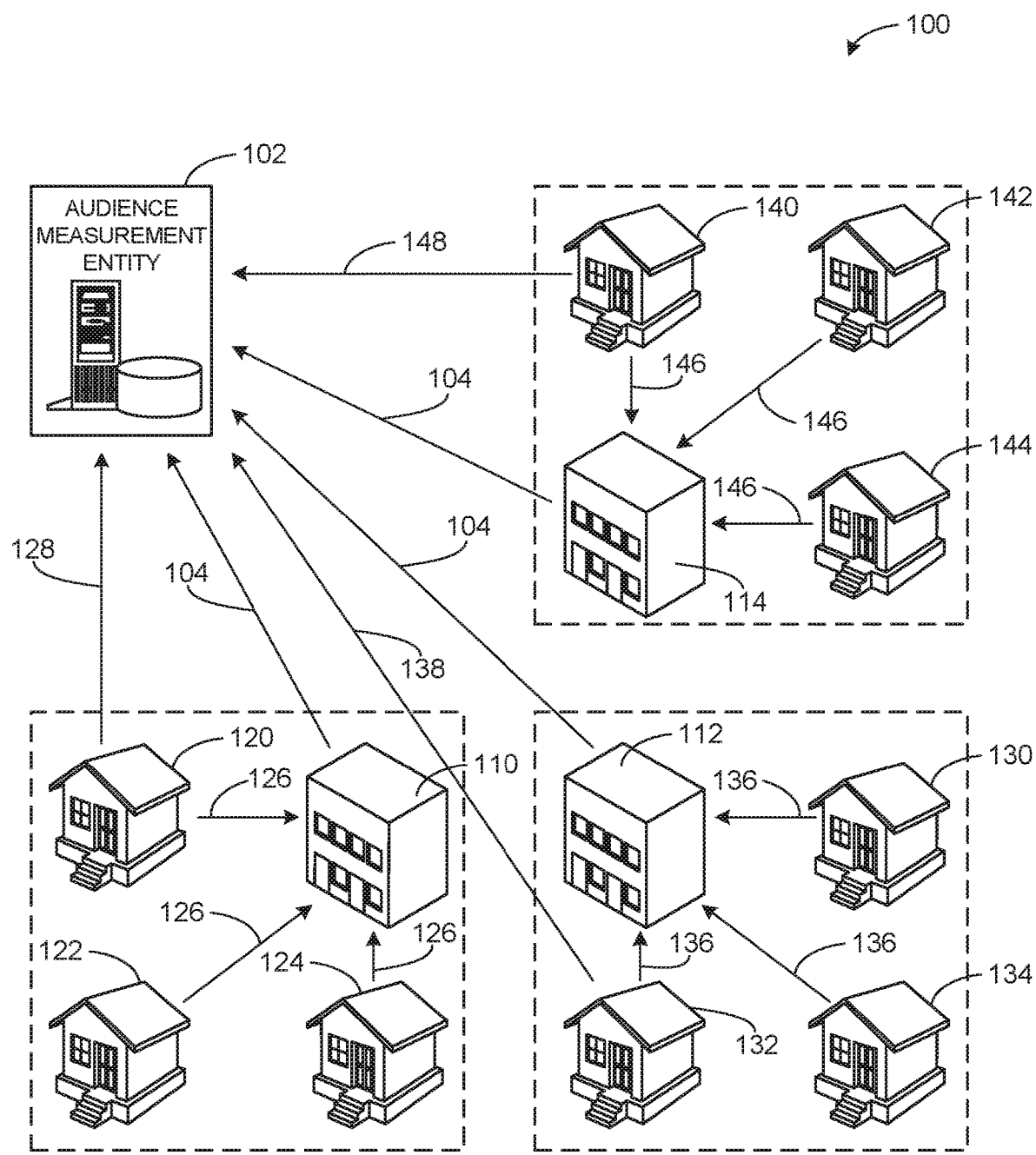
FIG. 1 illustrates an example media monitoring system including an example audience measurement entity for receiving set top box tuning data in accordance with the teachings of this disclosure.

Example methods, apparatus, systems and articles of manufacture (e.g., non-transitory, physical storage media) to detect and rectify false set top box tuning data are disclosed herein. Example methods disclosed herein to remove false tuning data include identifying in return path data a first group of set top boxes classified as likely to exhibit machine events in tuning data of the return path data more frequently than a second group of set top boxes represented in the return path data. Disclosed example methods also include determining whether the first group of set top boxes includes a machine event based on a pattern of the tuning data in the return path data of the first group of set top boxes. Disclosed example methods further include improving an accuracy of return path data by rectifying the machine event.

In some disclosed example methods the pattern of the tuning data corresponds to a difference between a first percentage of the first group of set top boxes having tuning events in the return path data during a first time interval and a second percentage of the second group of set top boxes having tuning events in the return path data during the first interval. Some disclosed examples also include removing first tuning data associated with the first time interval in the return path data corresponding to the first percentage of the first group of set top boxes.

Additionally or alternatively, in some disclosed example methods, the pattern of the tuning data includes a feature activated machine event producing false tuning data. In some such disclosed examples, the rectifying of the machine event includes identifying and removing the false tuning data while maintaining veridical tuning data in the return path data. Additionally or alternatively, in some such disclosed examples, the feature activated machine event is identified by a prerequisite of the feature activated machine event, the prerequisite determined by comparing return path data to panelist exposure data obtained from meters monitoring exposure of media to a panelist. In some such disclosed examples, the panelist exposure data is classified as veridical.

These and other example methods, apparatus, systems and articles of manufacture (e.g., non-transitory, physical storage media) to detect and rectify false set top box tuning data are disclosed in further detail below.

Audience measurement entities (AMEs) measure a composition and size of audiences consuming media to produce ratings of the media. Ratings may be used by advertisers and/or marketers to purchase advertising space and/or design advertising campaigns. Media producers and/or distributers may use the rating to determine how to set prices for advertising space and/or to make programming decisions. To measure the composition and size of an audience, AMEs (e.g., The Nielsen Company (US), LLC®) track audience members' exposure to media.

AMEs may enlist panelist households to participate in measurement panels. Media exposure and/or demographics data associated with the panelist households may be collected and may be used to project a size and demographic makeup of a population. Members of panelist households consent to AMEs collecting exposure data by measuring exposure of the panelist households to media (e.g., television programming, radio programming, online content, programs, advertising, etc.). As used herein, "exposure data" refers to information pertaining to media exposure events presented via a media presentation device (e.g., a television, a stereo, a speaker, a computer, a portable device, a gaming console, an online media presentation device, etc.) of a panelist household and associated with a person and/or group of persons of the household (e.g., panelist(s), member(s) of the panelist household). For example, panelist exposure data is obtained from meters monitoring exposure of media presentations of a household. Exposure data includes information indicating that a panelist is exposed to a media if the panelist is present in a room in which the media is being presented. To enable the AMEs to collect such exposure data, the AMEs typically provide panelist households with meter(s) that monitor media presentation devices (e.g., televisions, stereos, speakers, computers, portable devices, gaming consoles, and/or online media presentation devices, etc.).

Enlisting and retaining panelists for audience measurement can be a difficult and costly process for AMEs. For example, AMEs must carefully select and screen panelist households for particular characteristics so that a population of the panelist households is representative of the population as a whole. Because collecting information from panelist households can be difficult and costly, AMEs and other entities interested in measuring media/audiences have begun to collect information from other sources such as set-top boxes and/or over-the-top devices (e.g., a Roku® media device, an Apple TV® media device, a Samsung Smart TV® media device, a Google TV™ platform, a Google Chromecast™ device, an Amazon TV media device, a gaming console, a smart TV, a smart DVD player, an audio-streaming device, etc.). A set-top box is a device that converts source signals into media presented via a media presentation device. In some examples, the STB implements a digital video recorder (DVR) and/or a digital versatile disc (DVD) player. Further, some STBs are capable of recording tuning data of corresponding media presentation devices. As used herein, "tuning data" refers to information pertaining to tuning events (e.g., an STB being turned on or off, channel changes, tuning duration times, etc.) of an STB and/or a media presentation device of a household that is not associated with demographics data (e.g., number of household members, age, gender, race, etc.) of the household and/or members of the household.

Tuning data of the STB is collected by STB data providers, but households can opt out of this data collection (e.g., via processes of a third-party media provider and/or manufacturer, the AME, etc.). Many households are willing to provide tuning data via an STB, because personalized information is not collected by the STB. As used herein, households that consent to collection of tuning data (e.g., via an STB), but do not consent to collection of exposure data (e.g., media exposure data that is tied to a particular person such as a panelist) are referred to as "non-panelist households."

While collecting data from non-panelist households can greatly increase the amount of collected data about media exposure, the lack of exposure data reduces the value of this media exposure data.

In some examples, return path data from the STB contains false tuning data as a result of machine events. As used herein, "return path data" or "RPD" refers to tuning data collected at the STB and provided to the audience measurement entity. Additionally, as used herein, a "machine event" is an STB tuning event that is not directly initiated by a viewer. For example, the STB may undergo a software update that causes the STB to register tuning events not correlated to a viewer's activity, such as the STB restarting after the software updates, or cycling through channels upon completion of the update. In other examples, the STB experiences a machine event in response to viewer tuning events (e.g., a feature activated machine event), such as logged phantom tuning events after legitimate tuning events. For example, some machine events have a prerequisite (e.g., cause, precursor, etc.). In such examples, if the prerequisite of some feature activated machine events is known (e.g., a known feature activated machine event), and a pattern of tuning events can be identified as a machine event based on the pattern or identification of the prerequisite in RPD. Machine events reduce the accuracy of RPD-based media measurement.

Detection and rectification of machine events, in accordance with the teachings of this disclosure, can improve the accuracy of RPD-based media measurement. Rectification of machine events, including the removal of false tuning data while retaining veridical tuning events and/or the removal of all data corresponding to time intervals experiencing machine events, occurs after machine events have been detected and identified. Machine events are identified either based on known feature activated machine events or other evaluation of RPD patterns. In some examples, known feature activated machine events can be corrected, while other RPD patterns can only be rectified by deleting tuning data.

For example, a first group of set top boxes can exhibit machine events more frequently than a second group of set top boxes. In some examples, STBs from one media provider can exhibit machine events more than STBs from a different media provider. Additionally or alternatively, in some examples, a type of STB from a provider (e.g., DVR capable) can exhibit more machine events than a different type of STB from the same provider (e.g., non-DVR capable). Additionally or alternatively, in some examples one model of STB (e.g., second generation DVR) can exhibit more machine events than a different model of STB (e.g., first generation DVR) from the same provider. In accordance with the present disclosure, feature activated machine events can be identified based on characteristics of the STB (e.g., media provider, type, model, viewing/recording features, etc.).

Without rectification of machine events, false RPD data can be combined with panelist data resulting in the inaccurate estimation of trends in the tuning activity. Such methods are inaccurate and require excessive computer processing power and memory. However, rectification of machine events improves the accuracy of STB tuning data, the value of STB tuning data to media providers, and reduces the processor requirements and memory storage of RPD.

FIG. 1 illustrates an example media monitoring system 100 including an example audience measurement entity 102 for receiving and processing tuning data in accordance with the teachings of this disclosure. In the example media monitoring system 100 of FIG. 1, the example audience measurement entity 102 receives return path data (RPD) 104 from media providers 110, 112, 114. For example, the media providers 110, 112, 114 provide set top boxes (STBs) and media to viewers and collect tuning data from viewers who agree to share tuning data. RPD 104 is the tuning data collected by the media providers 110, 112, 114 and provided to the audience measurement entity 102. In some examples, the media providers 110, 112, 114 can operate in different geographical regions, while in other examples, the example media providers can compete in the same geographical region.

In the illustrated example, the example media provider 110 provides STB s and media to households 120, 122, 124. In response, the households 120, 122, 124, having agreed to share tuning data with the media provider 110, send tuning data 126 to the media provider 110. In the illustrated example, tuning data 126 is reported to the media provider 110 via network communications. In the illustrated, the example household 120 is a panelist household and has agreed to send exposure data 128 to the example audience measurement entity 102. Additionally or alternatively, media provider 112 provides STBs and media to households 130, 132, 134. In response, the households 130, 132, 134 provide tuning data 136 to the media provider 112. In the illustrated example, the example household 132 is a panelist household and has agreed to send exposure data 138. In the illustrated example, media provider 114 provide STBs and media to households 140, 142, 144. In response, the household 140, 142, 144 provide tuning data 146 to the media provider 114. In the illustrated example, the example household 140 provides exposure data 148 to the audience measurement entity 102.

In the example of FIG. 1, the media providers 110, 112, 114 provide the RPD 104 to the audience measurement entity 102. In some examples, the RPD is transmitted over network communications, while in other examples, one RPD can be provided as a memory device delivered to the audience measurement entity 102. In some examples, the RPD 104 includes false tuning data incurred by machine events from one or more of the STBs from households 120, 122, 124, 130, 132, 134, 140, 142, 144.

Figure 2:
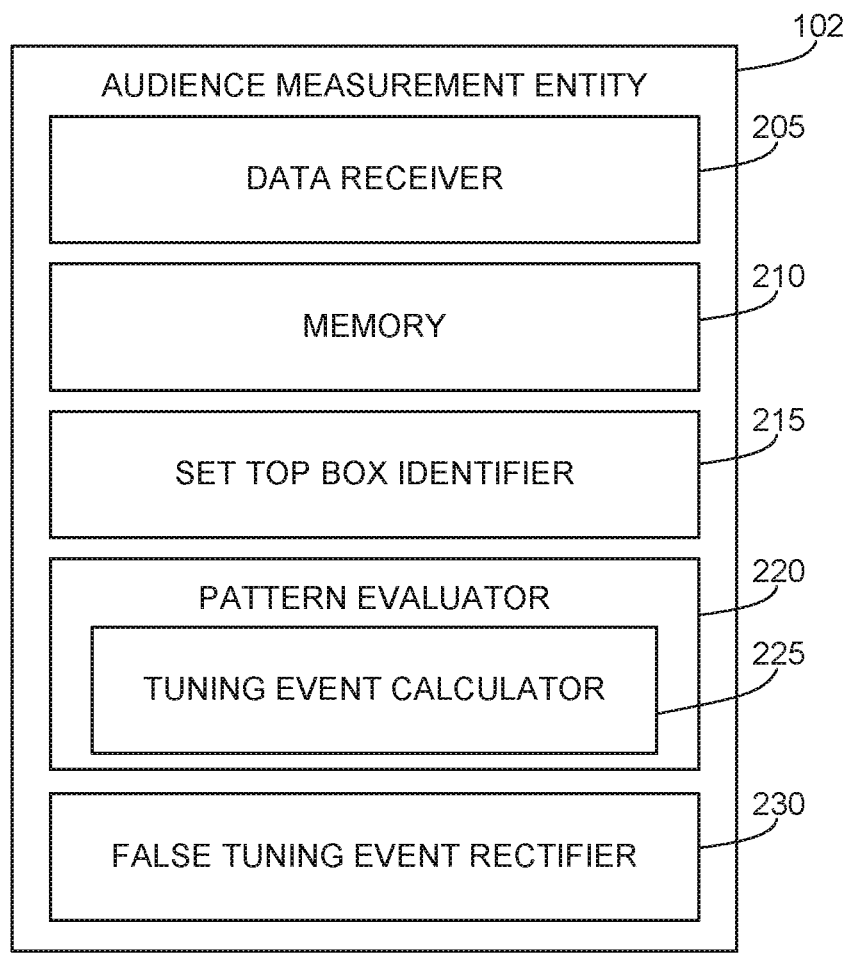
FIG. 2 illustrates an example block diagram of an example audience measurement entity for rectifying false set top box tuning data in accordance with the teachings of this disclosure.

FIG. 2 illustrates an example block diagram of the example audience measurement entity 102 of FIG. 1 for detecting and rectifying false tuning data incurred by machine events in accordance with the teaching of this disclosure. In the illustrated example of FIG. 2, the audience measurement entity 102 includes an example data receiver 205, an example memory 210, an example set top box identifier 215, an example pattern evaluator 220, an example tuning event calculator 225, and an example false tuning event rectifier 230. In other examples, the audience measurement entity 102 can include more components or fewer components.

The example data receiver 205 receives RPD from the example media providers 110, 112, 114 (FIG. 1). In some examples, the RPD is received periodically, a-periodically, and/or upon request by the audience measurement entity 102. The example RPD received by the data receiver 205 for a given STB includes information regarding the media provider, the model of STB, a record of tuning event(s), and timestamp(s) corresponding to the tuning event(s). In some examples, the RPD may include information regarding the type(s) of tuning event(s) and/or the channel(s) associated with the tuning event(s). The RPD is stored by the example data receiver 205 in the example memory 210.

The memory 210 of FIG. 2, stores RPD until the data is ready to be processed. For example, tuning data may be stored in the example memory 210 for up to two days (or some other duration) before being processed and evaluated. In other examples, processing the RPD can occur immediately. Additionally or alternatively, the memory 210 can be disposed separate from the audience measurement entity 102. In some examples, RPD received at the example data receiver 205 is configured for storage in the example memory 210. For example, information regarding the media provider, set top box model, and the tuning data can be organized for utilization by the audience measurement entity 102. In other examples, the RPD is stored in the memory 210 as provided by the media providers 110, 112, 114.

In the illustrated example, the example audience measurement entity 102 includes the example set top box identifier 215. The set top box identifier 215 accesses RPD to associate tuning data stored in memory with features of STBs providing the tuning data. For example, the set top box identifier 215 can identify a media provider associated with tuning data, a set top box model associated with tuning data, and/or a type of set top box associated with tuning data. Certain models and types of STB exhibit more machine events than other models and types of STB. As a result, the example set top box identifier 215 can further flag those STBs associated with the types and models that are likely to exhibit machine events. Additionally or alternatively, the set top box identifier 215 can associate tuning data with a given region, time zone, and/or other identifying characteristics of a STB.

The example pattern evaluator 220 evaluates patterns in the RPD for models and types of STB that exhibit machine events as identified by the set top box identifier 215. For example, some models and types of STB have identified patterns of machine events that produce false tuning events (e.g., such as examples in which activation of a record feature has been determined to produce a subsequent false tuning event of a given type, switching to certain channels at certain times has been determined to produce a subsequent false tuning event of a given type, etc.). In such examples, the pattern evaluator 220 evaluates data for models and types of STB that exhibit known machine events. For example, if model X produces false tuning data when the viewer switches to channel 1 after 7:00 μm, the example pattern evaluator 220 evaluates tuning data associated with model X STBs and flags all tuning data results from viewers switching to channel 1 after 7:00 pm as false. The example pattern evaluator 220 can evaluate RPD for any known pattern of machine events and appropriately flag the machine events. In some examples, the pattern evaluator 220 can determine if a percentage of tuning events for a given STB exceeds a threshold for a sufficient time interval.

The example tuning event calculator 225 calculates a percentage of set top boxes having tuning events starting or ending for a given time relative to a total number of set top boxes capable of having tuning events for the given time. For example, the tuning event calculator 225 calculates, based on the identification of the set top box identifier 215, the percentage of DVR capable set top boxes from the media provider 110 (FIG. 1) have a tuning event for a time (e.g., 07:36:25, 15:23:53, etc.) relative to a total number of DVR capable set top boxes the example media provider 110 has provided. In some examples, the tuning event calculator 225 calculates the percentage of a set top boxes having a model number or provided by a media provider. In some examples, the percentage of a certain model or type of STB, which exhibits machine events, having tuning data at a given time can be compared to a comparable model, compared to a comparable type, or compared to RPD tuning data overall to identify surges in RPD tuning data. If a difference or ratio of tuning events from STBs classified as likely to exhibit machine events compared to tuning events from STBs classified as not likely to exhibit machine events satisfies a threshold for a given time interval (e.g., 3 minutes, 5 minutes), the tuning calculator 225 flags those minutes that satisfy the threshold as including false tuning data as a result of machine events.

In the illustrated example, the audience measurement entity 102 also includes the example false tuning event rectifier 230. In some examples, the false tuning event rectifier removes only the false tuning data. However, in some examples, the false tuning event rectifier removes false tuning data along with veridical tuning data. For example, if the example pattern evaluator 220 flagged tuning data as false tuning data as a result of a machine event, the false tuning event rectifier 230 can remove or correct the false tuning data because the veridical tuning event and the false tuning event are both known based on the pattern. In other examples, the false tuning event rectifier 230 removes false tuning data without being able to distinguish from veridical tuning events or false tuning events, and, thus, removes both veridical and false tuning events for the flagged minutes.

Figure 3:
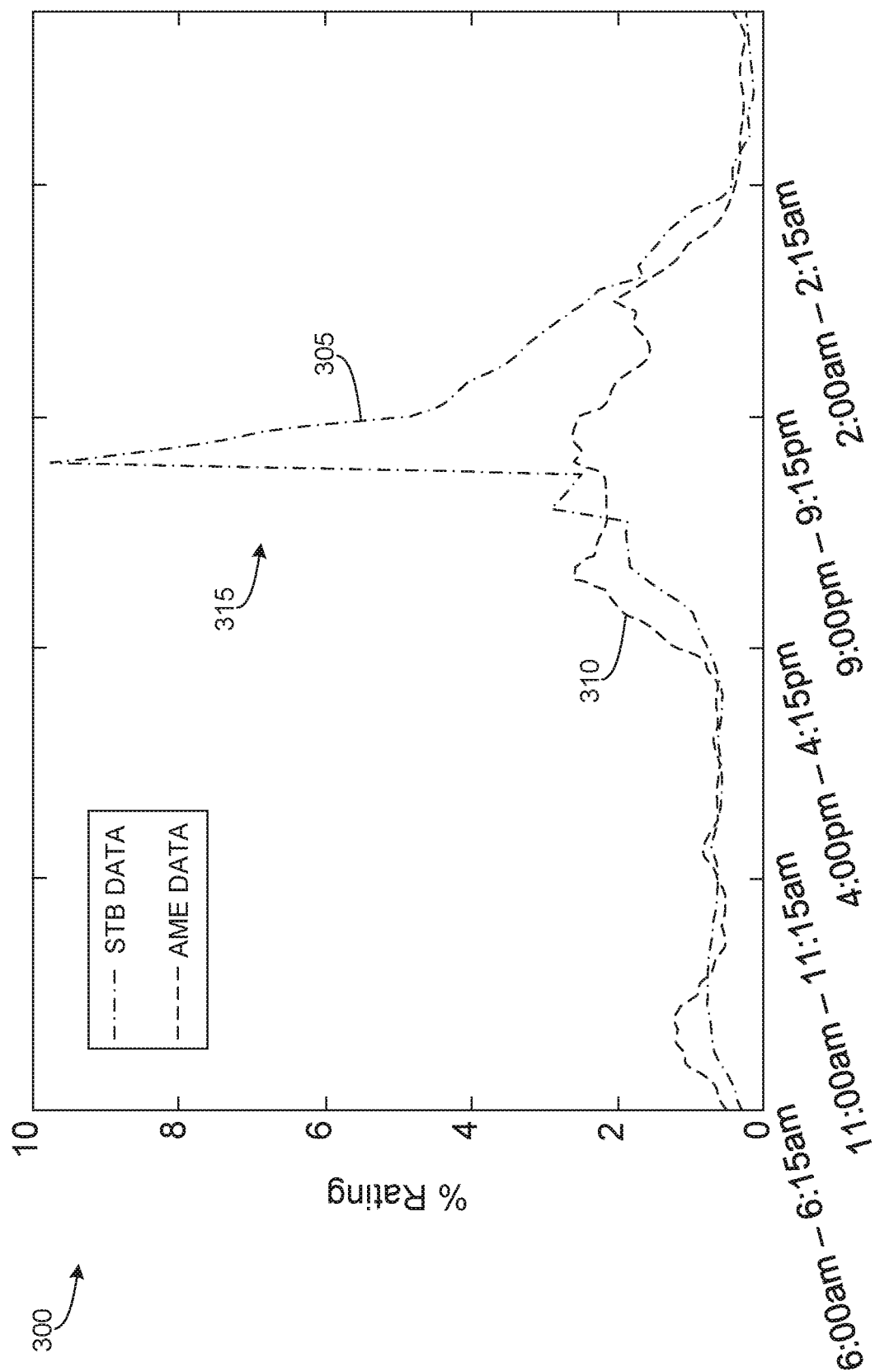
FIG. 3 is an example graph of set top box tuning data and panelist meter tuning data indicating the presence of a machine event.

FIG. 3 is an example graph of tuning data 300 of set top box tuning data 305 and audience measurement entity (AME) tuning data 310 (e.g., panelist meter tuning data) indicating the presence of a machine event. In the illustrated example, the STB tuning data 305 and the AME data 310 are substantially similar, with the exception of a surge in tuning events 315 in the STB tuning data 305 beginning just before 9:00 pm. The surge in tuning events 315 skews the value of STB tuning data 305. In the illustrated example, the accuracy of the STB tuning data 305 can be improved by removing the surge in tuning events 315 from the STB tuning data 305.

Figure 4:
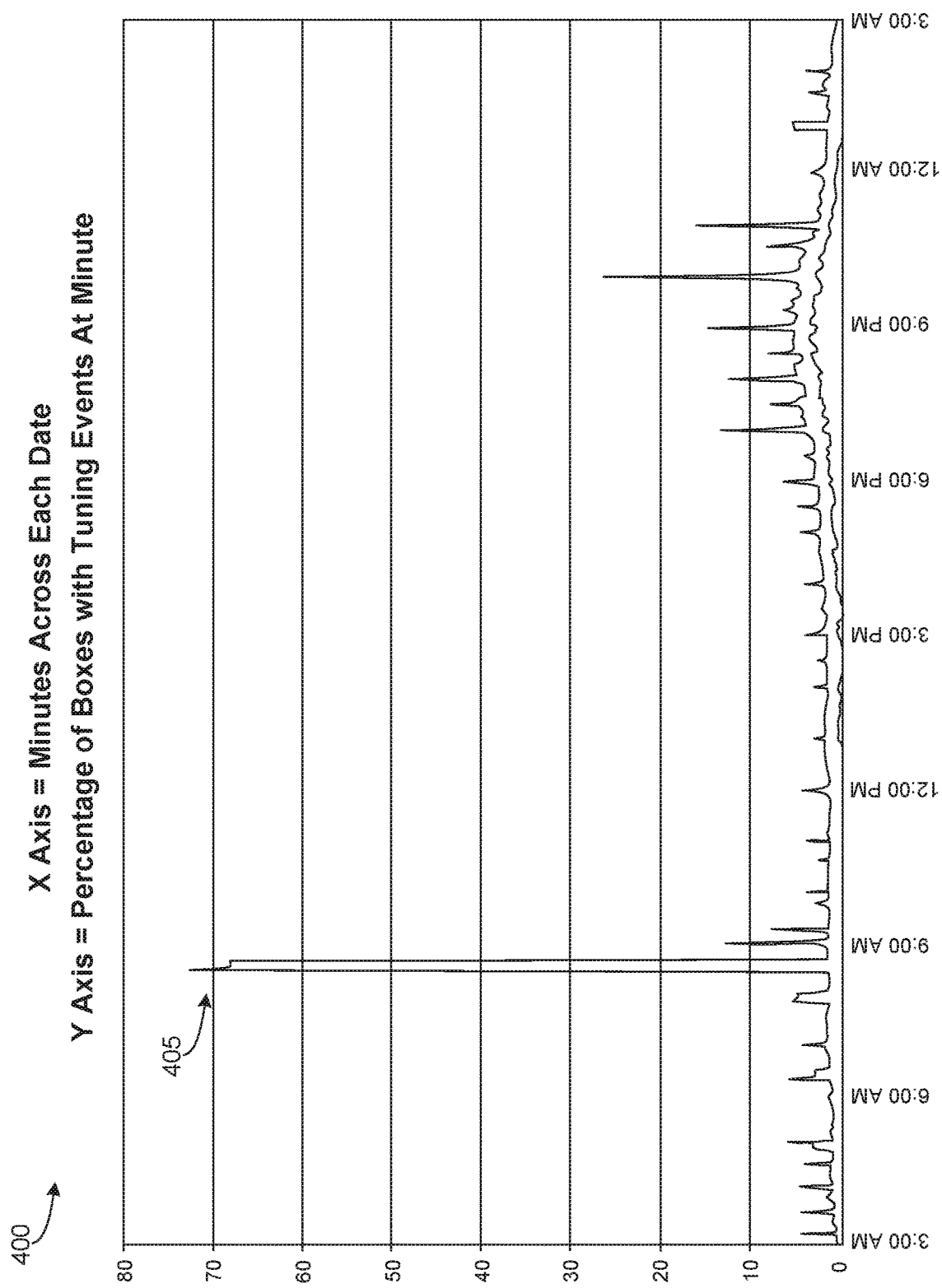
FIG. 4 is an example graph of tuning data indicating the presence of a machine event.

FIG. 4 is an example graph of tuning data 400 for a day indicating the presence of a machine event. The example graph of tuning data 400 includes one day of tuning data, from 3:00 a.m. to 3:00 a.m. Similar to the example graph of tuning data 300 of FIG. 3, the graph of tuning data 400 shows another surge in tuning data 405 that skews the value of STB tuning data. In the illustrated example, the surge in tuning data 405 shows the irregularity some machine events can exhibit. While the surge in tuning events 315 of FIG. 3 corresponded to an increase in actual tuning events, the surge in tuning events 405 stands in stark contrast to the quantity of tuning events in the surrounding hours of RPD.

Figure 5:
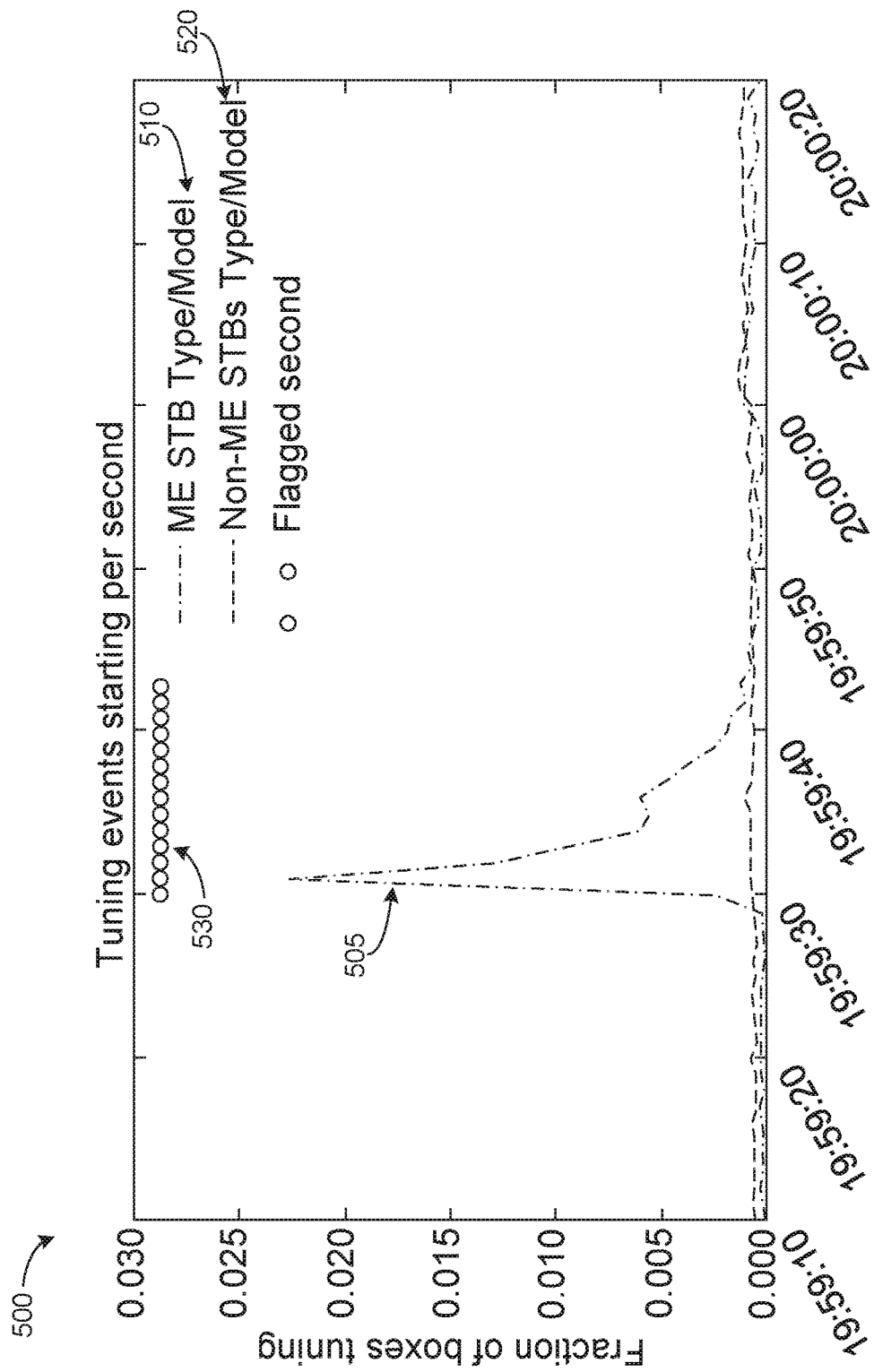
FIG. 5 is an example graph of tuning data indicating the identification of the presence of a machine event.

FIG. 5 is an example graph of tuning data 500 indicating the identification of the presence of a machine event 505. In the illustrated example, the set top box identifier 215 of FIG. 2 has identified a first group of set top boxes 510 and a second group of set top boxes 520. The first group of STBs 510 have features used to classify the STBs 510 as being likely to exhibit machine events, whereas the second group of STBs 520 have features used to classify the STBs 520 as being unlikely to exhibit machine events. In some examples, the example graph of tuning data 500 can evaluate additional groups of STBs classified as being likely or unlikely to exhibit machine events. The example machine event 505 is a feature activated machine event, which will be described in further detail in FIG. 6, but the machine event 505 could also not be associated with any known pattern. Additionally, in the illustrated example, the pattern evaluator 220 and/or the tuning event calculator 225 identify a flagged time interval 530.

In some examples, if the example first group of STBs 510 exhibit known feature activated machine events (e.g., a recognizable pattern associated with machine events), then the pattern evaluator 220 (FIG. 2) can evaluate the tuning data for the first group of STBs 510 for a known feature activated machine events. For example, if the event 505 corresponds to a known feature activated machine event, the example pattern evaluator 220 identifies the flagged time interval 530 (e.g., 30 seconds, 5 minutes) that includes the recognized pattern of the known feature activated machine event. However, in some examples, the example first group of STBs 510 exhibit machine events that do not follow a recognizable pattern. In some such examples, the tuning event calculator 225 (FIG. 2) determines a difference (e.g., expressed as a ratio or some other comparison value) of the percentage of tuning events for the first group of STBs 510 to the second group of STBs 520. The difference (e.g., ratio) between the tuning events of the first group of STBs 510 and the second group of STBs 520 is compared to a threshold. If the threshold is satisfied for a sufficient period of time, such as corresponding to the event 505, the example tuning event calculator 225 (FIG. 2) flags the time interval 530 during which the threshold is satisfied.

In some examples, the threshold may vary. For example, during some parts of the day tuning data may be naturally erratic (e.g., morning news, primetime, etc.), while in other parts of the day tuning may be naturally more stable (e.g., daytime, overnight). As a result, the threshold may be higher during the erratic times (e.g., 200 percentage point (pp) difference, 300 pp difference, or some other value). Additionally or alternatively, the threshold may be lower during the more stable times (e.g., 50 pp difference, 125 pp difference, or some other value).

FIG. 6 is an example table of tuning data 600 indicating a pattern of tuning data indicative of a machine event. In the illustrated example of FIG. 6, a feature activated event start time 605 corresponds to a follow-up tuning event start time 610. In the illustrated example, 99.2% of follow-up tuning events start within 7 seconds of the feature activated event start time. The time pattern of the feature activated event start time 605 and the follow-up tuning event start time 610 is a recognizable pattern to identify false tuning. For example, some STBs include follow-up tuning to a channel different from the channel for the viewing feature after the start of a recording feature. In some examples, the follow-up tuning channel is consistently the same across STBs having a similar model, type, or feature. The feature and follow-up event start times are identifiable based on the time proximity of the events (e.g., less than 10 seconds, less than 30 seconds) and the repeated channel change. Such a machine event can be identified in a single STB and verified across a group of STBs having a similar model, type and/or feature. Additionally or alternatively, some feature and follow-up events may have different station IDs, making identification of the false tuning data easier. In some examples, guide updates, viewing/recording features, viewing recorded programs, video downloads, pay-per-view, software updates, and/or other features can be followed be false follow-up tuning events.

FIG. 7 is another example table of tuning data 700 indicating a pattern of tuning data indicative of a machine event that can be identified by comparing RPD to panelist exposure data for the same STB. In some examples, STBs will also correspond to panelists included in an AME's exposure data. The AME's exposure data for such STBs can be referred to as common home data. In some such examples, the common home data for an STB included in both the RPD and AME exposure data can be used to identify machine events in the RPD. In the illustrated example of FIG. 7, a set top box exhibits a machine event and produces a false tuning event 705 in the RPD. In some examples, the machine event was a result of the time of day, tuning to a specific station channel 710, or a combination of tuning to the specific station channel at the particular time of day. In the illustrated example, comparison of the station channel 710 and the AME device station 720 reported in the AME exposure data for that same STB is used to determine the pattern of feature activated machine events. In the illustrated example, after a viewer changes the channel at 730, the STB stops producing false tuning data in the RPD.

FIG. 8 is an example table of tuning data 800 indicating a pattern of tuning data indicative of a machine event. In the illustrated example of FIG. 8, an STB exhibits a machine event during a use of a "Timer_record" function. The example table of tuning data 800 indicates a pattern of station channel switching at regular timing intervals as a result of the recording feature. In the illustrated example, comparison of the station channel 810 and the AME device station 820 in the AME exposure data for the same STB is used to determine the pattern of feature activated machine events.

In the illustrated examples of FIGS. 7 and 8, the patterns of false tuning data are determined by comparing STB tuning data to panelist exposure data available for the same STB(s) (e.g., referred to as common home data). In the example of FIG. 7, the pattern of tuning data is indicative of a machine event when either the station channel 710 reported in the RPD switches from 4555 to 5894, but the station channel reported in the AME exposure data (e.g., which is generally more reliable) for the same STB remains on 5894. Thus, the channel change reported in the RPD for the STB corresponds to a false tuning event. In some examples, STB tuning data indicates patterns of tuning data when no panelist exposure data is collected from a panelist meter. For example, if the meter obtains no panelist exposure data while the RPD tuning data for the same STB indicates a regular alternating pattern of "LIVE_TUNE" and "TIMER_RECORD," that pattern may be identified as a possible pattern associated with a machine event. If the same pattern is regularly found in RPD as false tuning data, the pattern of tuning data can be classified as a machine event. As a result, tuning data having a pattern not consistent with panelist exposure data can be identified and rectified in RPD.

While an example manner of implementing the audience measurement entity of FIG. 1 is illustrated in FIGS. 2-8, one or more of the elements, processes and/or devices illustrated in FIG. 2-8 may be combined, divided, re-arranged, omitted, eliminated, and/or implemented in any other way. Further, the example data receiver 205, the example memory 210, the example set top box identifier 215, the example pattern evaluator 220, the example tuning event calculator 225, the example false tuning event rectifier 230 and/or, more generally, the example audience measurement entity 102 of FIG. 2 may be implemented by hardware, software, firmware and/or any combination of hardware, software and/or firmware. Thus, for example, any of the example data receiver 205, the example memory 210, the example set top box identifier 215, the example pattern evaluator 220, the example tuning event calculator 225, the example false tuning event rectifier 230 and/or, more generally, the example audience measurement entity 102 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, data receiver 205, the example memory 210, the example set top box identifier 215, the example pattern evaluator 220, the example tuning event calculator 225, the example false tuning event rectifier 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement entity of FIG. 1 may include one or more elements, processes and/or devices in addition to, or instead of, those illustrated in FIGS. 2-8, and/or may include more than one of any or all of the illustrated elements, processes, and devices.

Figure 9:
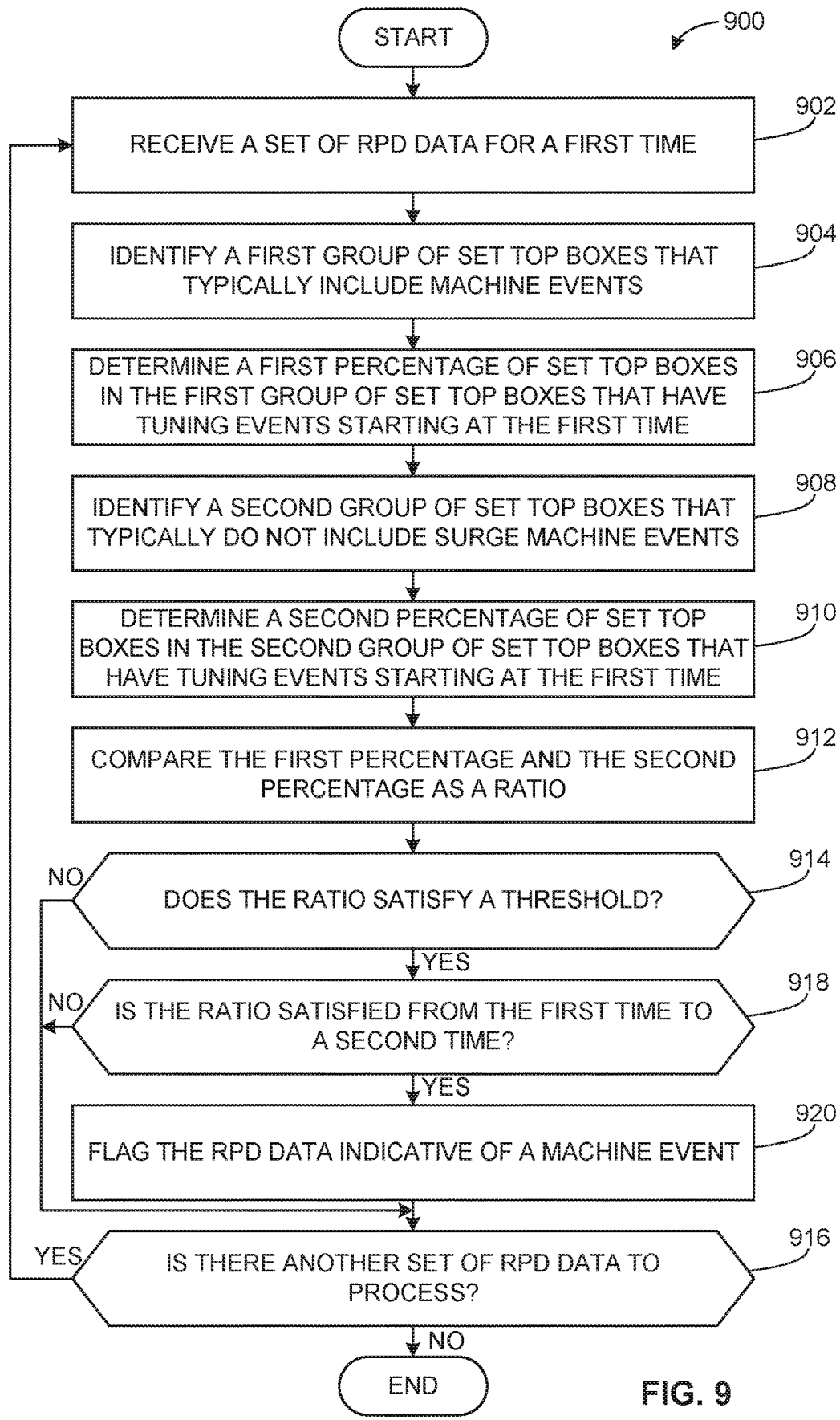
FIG. 9 is a flowchart representative of first example computer readable instructions that may be executed to implement the example audience measurement entity of FIG. 2.
Figure 10:
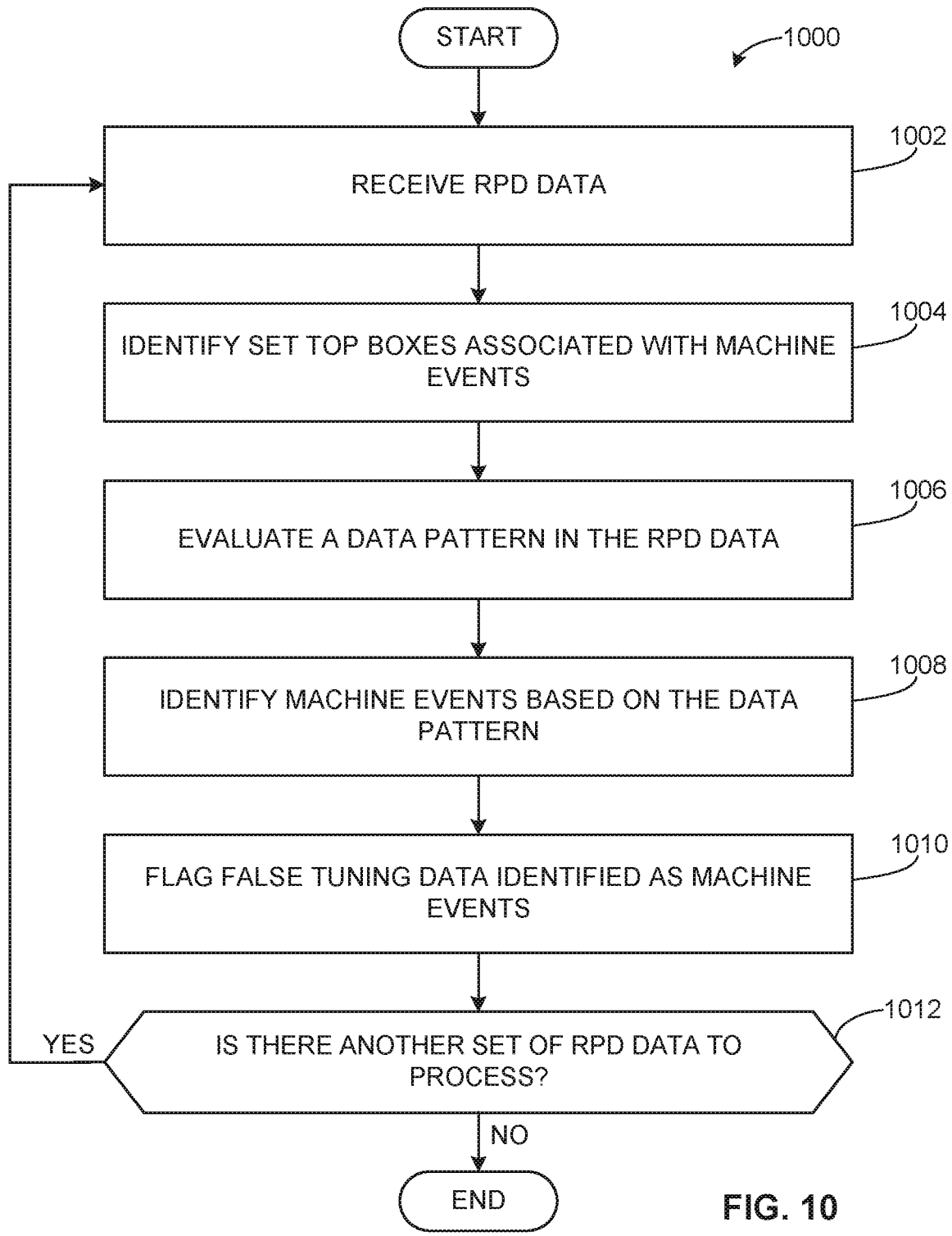
FIG. 10 is a flowchart representative of second example computer readable instructions that may be executed to implement the example audience measurement entity of FIG. 2.

Flowcharts representative of example machine readable instructions for implementing the audience measurement entity 102 of FIGS. 1 and/or 2 are shown in FIGS. 9-10. In these examples, the machine readable instructions comprise a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIG. 9-10, many other methods of implementing the example audience measurement entity 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 9 is a flowchart representative of example computer readable instructions 900 that may be executed to implement the example audience measurement entity of FIGS. 1 and/or 2. Execution of the example computer readable instructions 900 is described in connection with the audience measurement entity 102 of FIG. 2, but can, in some examples, be applicable to other data processing facilities.

The data receiver 205 receives RPD from a media provider, such as the example media provider 110 of FIG. 1 (Block 902). Additionally, the data receiver 205 sends the RPD to the memory 210. In some examples, the example data receiver 205 configures the RPD from the media provider for use by the audience measurement entity 102, while in other examples, the RPD is stored as it is received. The example data receiver 205 can receive RPD via network communications, physical connection to a memory storage device, or other similar data communication systems.

The set top box identifier 215 identifies a first group of set top boxes in the RPD that typically include machine events (Block 904) (e.g., are likely to exhibit machine events). For example, the set top box identifier 215 accesses the memory 210, and identifies set top boxes classified as exhibiting machine events based on their type and model number. In some examples, for a first media provider the example set top box identifier 215 identifies DVR capable STBs provided by a first media provider and that are known for exhibiting machine events. In some examples, the set top boxes classified as exhibiting machine events are classified by analysis of RPD, while other set top boxes are classified as exhibiting machine events based on the features of the set top box. However, for a second media provider, the example set top box identifier 215 may identify a different model of STB known for exhibiting machine events.

The tuning event calculator 225 determines a first percentage of set top boxes in the first group of set top boxes that have tuning events starting at a first time (Block 906). For example, if the set top box identifier 215 identifies DVR capable STB s of the media provider as being classified into the first group of STBs, the tuning event calculator 225 calculates the percentage of DVR capable STBs of the media provider having tuning events during the first time, which, in some examples, covers a short time interval (e.g., 1 second, 5 seconds, 1 minute).

The set top box identifier 215 identifies a second group of set top boxes in the RPD that typically do not include machine events (Block 908) (e.g., are unlikely to exhibit machine events). For example, the set top box identifier 215 accesses the memory 210, and identifies set top boxes classified as not exhibiting machine events based on their type and model number. In some examples, for a first media provider the example set top box identifier 215 identifies non-DVR capable STBs provided by the first media provider and that are known for not exhibiting machine events. However, for a second media provider, the example set top box identifier 215 may identify a different model of STB known for not exhibiting machine events.

The tuning event calculator 225 determines a second percentage of set top boxes in the second group of set top boxes that have tuning events starting at the first time (Block 910). For example, if the set top box identifier 215 identifies non-DVR capable STBs of the media provider as being classified into the second group of STBs, the tuning event calculator 225 calculates the percentage of non-DVR capable STBs of the media provider having tuning events, during the first time, which, in some examples, covers a short time interval (e.g., 1 second, 5 seconds, 1 minute).

The tuning event calculator 225 determines a ratio of the first percentage of set top boxes from the first group having tuning events to the second percentage of set top boxes from the second group having tuning events (Block 912). If the ratio satisfies a threshold, the instructions continue to block 916, otherwise the instructions continue to block 918. If the tuning event calculator 225 determines the ratio has satisfied the threshold for a sufficient time interval (e.g., 1 second, 5 seconds, 15 seconds, etc.), the instructions continue to block 920, otherwise, the instructions continue to block 916.

The tuning event calculator 225 flags RPD indicative of a machine event (Block 920). In some examples, the false tuning event rectifier 230 rectifies the false tuning events generated by the machine event. For example, the false tuning event rectifier 230 may remove all RPD generated by STBs exhibiting machine events for the flagged seconds, while in other examples, the false tuning event rectifier 230 determines which tuning events are false tuning events and removes only the false tuning events. In yet other examples, the RPD indicative of a machine event can be adjusted to correspond to the RPD not indicative of machine events. In some examples, RPD indicative of a machine event is adjusted by randomly removing set top box tuning events until a percentage of tuning events reported by the group of set top boxes associated with machine events is within a threshold of the percentage of tuning events reported by a group of set top boxes not associated with machine events (e.g., within 50%, within 10%, etc.). In some examples, after the RPD has been adjusted, the RPD is validated and analyzed to determine the amount of surges or drops for different models or types of STBs has reached acceptable levels.

The audience measurement entity determines if there is another set of RPD to process (Block 916). If there is another set of RPD to process, the instructions 900 return to block 902. In some examples, the additional set of RPD could be for a second time or RPD from a different media provider. Additionally or alternatively, a subset of the first group could evaluated for machine events.

FIG. 10 is a flowchart representative of example computer readable instructions that may be executed to implement the example audience measurement entity of FIGS. 1 and/or 2. Execution of the example computer readable instructions 1000 is described in connection with the audience measurement entity 102 of FIG. 2, but can, in some examples, be applicable to other data processing facilities.

The example instructions 1000 begin when the data receiver 205 receives a set of RPD data for a first time interval (Block 1002). Additionally, the data receiver 205 sends the RPD to the memory 210. In some examples, the example data receiver 205 configures the RPD from the media provider for use by the audience measurement entity 102, while in other examples, the RPD is stored as it is received. The example data receiver 205 can receive RPD via network communications, physical connection to a memory storage device, or other similar data communication systems.

The set top box identifier 215 identifies a group of set top boxes that typically include machine events (Block 1004). For example, the set top box identifier 215 accesses the memory 210, and identifies set top boxes classified as exhibiting known feature activated machine events based on their type and model number. In some examples, for a first media provider the example set top box identifier 215 identifies DVR capable STBs provided by a first media provider and that are known for exhibiting machine events. However, for a second media provider, the example set top box identifier 215 may identify a different model of STB known for exhibiting machine events.

The pattern evaluator 220 evaluates a data pattern in the RPD (Block 1006). For example, the pattern evaluator 220 compares the data pattern to an identified prerequisite of feature activated machine events. In some examples, a machine event is restricted to a certain time of day, while in other examples, the machine event could occur at any time during the day. Additionally, the pattern evaluator 220 can evaluate RPD for more than one feature activated machine event.

In some examples, a prerequisite of a feature activated machine event is the activation of an automatic recording of programs during certain times of the day (e.g., automatic recording of primetime shows). For example, in response to the recording of a program, a follow-up tuning event is recorded within a short time of the recording event (e.g., 10 seconds, 1 minute, etc.). In some examples, the pattern of a station code associated with the recording and a second, follow-up station code aides in the detection and later rectification of the false tuning event.

Another example of a prerequisite of a feature activated machine event includes viewing a first television program for a first station and viewing a second television program for the first station immediately preceding the first television program. In such an example, a false tuning event can be generated by the machine in between two recordings at various times of the day. For example, a viewer on channel 1 is viewing the channel 1 programming from 3:01:01 p.m. until 5:25:12 p.m. However at 4:59:45 the STB records an OFF event and at 4:59:45 the STB records an ON event. The same second or next second OFF/ON tuning event is another example prerequisite that aides in the detection and later rectification of the false tuning event.

While several examples of tuning events patterns indicative of a feature activated machine event have been disclosed herein, additional patterns can be indicative of feature activated machine events. Regular comparison of panelist exposure data against RPD is useful to identify discrepancies between the veridical tuning data (e.g., panelist exposure data) and the RPD. Analysis of discrepancies between the veridical tuning data and the RPD can result in identifying additional patterns indicative of feature activated machine events.

The pattern evaluator 220 flags false tuning data identified as the machine event (Block 1008). In some examples, the pattern evaluator 220 only identifies false tuning data produced by the machine event and does not flag veridical tuning data. In some examples, the false tuning event rectifier 230 rectifies (e.g., corrects, removes, etc.) the false tuning events generated by the machine event. For example, the false tuning event rectifier 230 may remove all RPD generated by STBs exhibiting machine events for the flagged seconds, while in other examples, the false tuning event rectifier 230 determines which tuning events are false tuning events and removes only the false tuning events. In yet other examples, the RPD indicative of a machine event can be adjusted to correspond to the RPD not indicative of machine events. In some examples, RPD indicative of a machine event is adjusted by randomly removing set top box tuning events until a percentage of tuning events reported by the group of set top boxes associated with machine events is within a threshold of the percentage of tuning events reported by a group of set top boxes not associated with machine events (e.g., within 50%, within 10%, etc.). In some examples, after the RPD has been adjusted, the RPD is validated and analyzed to determine the amount of surges or drops for different models or types of STBs has reached acceptable levels.

The audience measurement entity 102 determines if there is another set of RPD to process (Block 1010). If there is another set of RPD to process, the instructions 900 return to block 902. In some examples, the additional set of RPD could be for a second time or RPD from a different media provider. Additionally or alternatively, a subset of the first group could evaluated for machine events.

Figure 11:
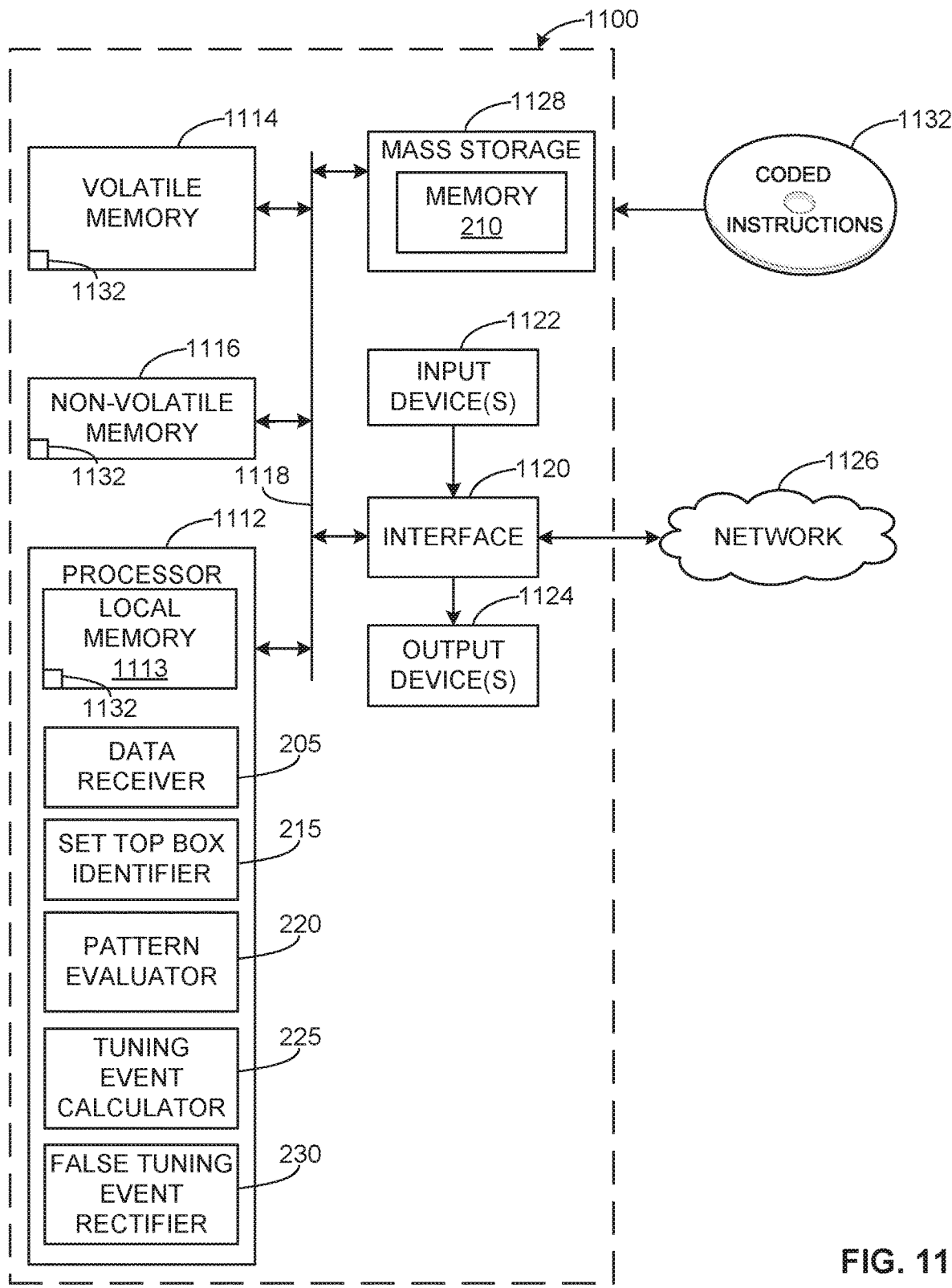
FIG. 11 is a block diagram of an example processor platform structured to execute the example computer readable instructions of FIGS. 9 and/or 10 to implement the example audience measurement entity of FIG. 2.

FIG. 11 is a block diagram of an example processor platform 1100 capable of executing the instructions of FIGS. 9-10 to implement the example audience measurement entity 102 of FIG. 2. The processor platform 1100 can be, for example, a server, a personal computer, a mobile device (e.g., a cell phone, a smart phone, a tablet such as an iPad™), an Internet appliance, a DVD player, a digital video recorder, a Blu-ray player, a gaming console, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor implements data receiver 205, the example set top box identifier 215, the example pattern evaluator 220, the example tuning event calculator 225, and the example false tuning event rectifier 230.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. In this example, the mass storage device includes the example memory 210.

The coded instructions 1132 of FIGS. 9-10 may be stored in the mass storage device 1128, in the volatile memory 1114, in the non-volatile memory 1116, and/or on a removable tangible computer readable storage medium such as a CD or DVD.

From the foregoing, it will be appreciated that example methods, apparatus and articles of manufacture have been disclosed that detect and/or rectify false set top box tuning data. False tuning data is determined by comparing STB tuning data to trustworthy RPD to determine machine events and/or by evaluating patterns in collected tuning data. Rectification of RPD improves the field of STB media monitoring by improving the accuracy of data collected. Rectified RPD reduces the amount of processing power required to augment RPD data to correlate with panelist data. Additionally, by removing false tuning events, computers processing RPD require lower memory requirements and less processing power.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A computing system comprising:
 a processor;
 at least one memory, having stored thereon program instructions that, upon execution by the processor, cause performance of operations comprising:
  identifying, in return path data, first tuning data corresponding to a first group of set-top boxes, the first group of set-top boxes classified as associated with machine events;
  making a comparison of first tuning events in the return path data and second tuning events in the return path data, the first tuning events attributed to the first group of the set-top boxes, the second tuning events attributed to a second group of the set-top boxes; and
  based on an output of the comparison satisfying a threshold during a time interval, removing second tuning data associated with the time interval from the first tuning data.

2. The computing system of claim 1, wherein the second group of the set-top boxes have a different classification than the first group of set-top boxes.

3. The computing system of claim 1, wherein the second group of the set-top boxes are classified as not likely to exhibit machine events.

4. The computing system of claim 1, wherein the removed second tuning data includes one or more of false tuning data or veridical tuning data contained in the return path data.

5. The computing system of claim 1, the operations further comprising:
 identifying the second tuning data associated with the time interval based on a portion of the first tuning data defining a pattern indicative of an occurrence of at least one of the machine events associated with the first group of set-top boxes.

6. The computing system of claim 5, wherein the time interval is longer than a duration of the at least one of the machine events.

7. The computing system of claim 5, wherein the at least one of the machine events corresponds to at least one phantom tuning machine event.

8. A method to process return path data from set-top boxes, the method comprising:
 identifying, by executing an instruction with a processor, in the return path data, first tuning data corresponding to a first group of set-top boxes, the first group of set-top boxes classified as associated with machine events;
 making, by executing an instruction with the processor, a comparison of first tuning events in the return path data and second tuning events in the return path data, the first tuning events attributed to the first group of the set-top boxes, the second tuning events attributed to a second group of the set-top boxes; and
 based on an output of the comparison satisfying a threshold during a time interval, removing, by executing an instruction with the processor, second tuning data associated with the time interval from the first tuning data.

9. The method of claim 8, wherein the second tuning data has a smaller data size than the first tuning data.

10. The method of claim 8, wherein the threshold varies across different periods of time.

11. The method of claim 8, wherein the removed second tuning data includes one or more of false tuning data or veridical tuning data contained in the return path data.

12. The method of claim 8, further comprising identifying the second tuning data associated with the time interval based on a portion of the first tuning data defining a pattern indicative of an occurrence of at least one of the machine events associated with the first group of set-top boxes.

13. The method of claim 12, wherein the time interval is longer than a duration of the at least one of the machine events.

14. The method of claim 12, wherein the at least one of the machine events corresponds to at least one phantom tuning machine events.

15. A non-transitory computer-readable medium comprising computer-readable instructions which, when executed by a processor, cause the processor to perform operations comprising:
 identifying, in return path data, first tuning data corresponding to a first group of set-top boxes, the first group of set-top boxes classified as associated with machine events;
 making a comparison of first tuning events in the return path data and second tuning events in the return path data, the first tuning events attributed to the first group of set-top boxes, the second tuning events attributed to a second group of the set-top boxes; and
 based on an output of the comparison satisfying a threshold during a time interval, removing second tuning data associated with the time interval from the first tuning data.

16. The non-transitory computer-readable medium of claim 15,
wherein the second tuning data has a smaller data size than the first tuning data.

17. The non-transitory computer-readable medium of claim 15,
wherein the threshold is to vary across different periods of time.

18. The non-transitory computer-readable medium of claim 15,
wherein the removed second tuning data includes one or more of false tuning data or veridical tuning data contained in the return path data.

19. The non-transitory computer-readable medium of claim 15, the operations further comprising:
identifying the second tuning data associated with the time interval based on a portion of the first tuning data defining a pattern indicative of an occurrence of at least one of the machine events associated with the first group of set-top boxes.

20. The non-transitory computer-readable medium of claim 19,
wherein the at least one of the machine events corresponds to at least one phantom tuning machine event.

* * * * *